(12) United States Patent
Kolczyk et al.

(10) Patent No.: US 7,267,768 B2
(45) Date of Patent: Sep. 11, 2007

(54) LIQUID FILTER

(75) Inventors: Markus Kolczyk, Mundelsheim (DE); Dieter Schreckenberger, Marbach (DE)

(73) Assignee: Mann & Hummel GmbH, Ludwigsburg (DE)

( * ) Notice: Subject to any disclaimer, the term of this patent is extended or adjusted under 35 U.S.C. 154(b) by 67 days.

(21) Appl. No.: 11/295,619

(22) Filed: Dec. 7, 2005

(65) Prior Publication Data
US 2006/0118474 A1 Jun. 8, 2006

(30) Foreign Application Priority Data
Dec. 7, 2004 (DE) ............. 10 2004 059 061

(51) Int. Cl.
*B01D 27/08* (2006.01)
*B01D 35/30* (2006.01)

(52) U.S. Cl. ............. 210/232; 210/443; 210/444; 210/450; 210/DIG. 17

(58) Field of Classification Search ............. 210/232, 210/443, 444, 450, DIG. 17
See application file for complete search history.

(56) References Cited

U.S. PATENT DOCUMENTS

| | | | | |
|---|---|---|---|---|
| 3,490,594 A | * | 1/1970 | Hutchins, Jr. | 210/232 |
| 4,052,307 A | * | 10/1977 | Humbert, Jr. | 210/130 |
| 4,764,275 A | * | 8/1988 | Robichaud | 210/232 |
| 4,992,166 A | * | 2/1991 | Lowsky et al. | 210/130 |
| 5,084,162 A | * | 1/1992 | Conti | 210/232 |
| 5,182,015 A | * | 1/1993 | Lee | 210/94 |
| 5,300,223 A | * | 4/1994 | Wright | 210/232 |
| 5,569,373 A | * | 10/1996 | Smith et al. | 210/90 |
| 5,605,624 A | * | 2/1997 | Wright | 210/232 |
| 5,762,671 A | * | 6/1998 | Farrow et al. | 55/496 |
| 5,876,600 A | * | 3/1999 | Matsubara et al. | 210/443 |
| 6,048,454 A | | 4/2000 | Jenkins | |
| 6,136,183 A | | 10/2000 | Suzuki et al. | |
| 6,475,380 B1 | | 11/2002 | Fangmann et al. | |
| 2005/0035042 A1 | | 2/2005 | Rowe et al. | |

FOREIGN PATENT DOCUMENTS

| | | |
|---|---|---|
| DE | 198 18 334 A1 | 10/1998 |
| DE | 199 25 635 A1 | 12/2000 |
| EP | 0 547 896 A3 | 6/1993 |
| EP | 0 830 885 A1 | 3/1998 |
| GB | 2 381 760 B | 5/2003 |

OTHER PUBLICATIONS

European Search Report dated Apr. 10, 2007 (eight(8)pages).

* cited by examiner

*Primary Examiner*—Thomas M. Lithgow
(74) *Attorney, Agent, or Firm*—Crowell & Moring LLP

(57) ABSTRACT

A liquid filter, in particular for internal combustion engines, having a filter housing with an essentially hollow cylindrical filter element arranged therein in a sealing manner to separate an unfiltered liquid side of the filter from a filtered liquid side. The filter element is supported on a connecting element having contours for forming a form-fitting connection through which the liquid filter is detachably and sealingly connectable to a counterpart. The counterpart may be a flange connected directly to a machine assembly, or it may be an adapter element for adapting the form-fitting connection to connect to a conventional threaded connector.

10 Claims, 3 Drawing Sheets

LIQUID FILTER

BACKGROUND OF THE INVENTION

The present invention relates to a liquid filter such as that widely used as a replaceable filter for the lubricating oil circulation of an internal combustion engine. Additional possible applications include, for example, hydraulic circuits in mobile or stationary systems. To perform maintenance, the filter element and a housing permanently connected to the filter element are replaced.

A liquid filter of this type is disclosed, for example, in U.S. Pat. No. 6,136,183 (=DE 198 18 334), where the liquid filter with a thread provided on a reinforcing panel is screwed onto a flange corresponding to the liquid filter. To seal the connection with respect to the environment, an elastomer gasket that acts axially is clamped between the flange and the liquid filter.

It is a disadvantage in this case that the clamping force on the gasket is determined only by the tightening torque and the angle of rotation of the thread. In addition, the threaded connection is secured only by the adhesive friction of the gasket relative to the flange and the liquid filter. As a result, the threaded connection can become loosened due to external influences such as temperature and/or vibration.

SUMMARY OF THE INVENTION

Accordingly, it is an object of the present invention to provide an improved replaceable liquid filter.

Another object of the invention is to provide a replaceable liquid filter which, regardless of a defined tightening torque, allows a reliable attachment and sealing with respect to a flange.

A further object of the invention is to provide a replaceable liquid filter which can be installed easily and rapidly and results in a reliable and secure connection.

These and other objects are achieved in accordance with the present invention by providing a liquid filter comprising a filter housing with an essentially hollow cylindrical filter element arranged therein in a sealing manner to separate an unfiltered liquid side of the filter from a filtered liquid side, the filter housing being detachably and sealingly connectable to a counterpart, in which means for forming a detachable form-fitting non-threaded connection are provided on an axial end of the filter housing and on the counterpart.

In accordance with a further aspect of the invention, the objects are achieved by providing a counterpart for a liquid filter which filter comprises a filter housing having means for forming a detachable form-fitting non-threaded connection provided on an axial end thereof, in which the counterpart comprises means for forming a mating form-fitting connection to the liquid filter and means for sealing the connection between the filter housing and the counterpart, whereby said counterpart is detachably and sealingly connectable to said filter housing.

The liquid filter according to the invention thus comprises a filter housing, a filter element and a connecting area on which means are provided for forming a form-fitting or interlocking connection with a counterpart. The filter housing may be constructed as a so-called hybrid component, for example, which may have a metallic vessel sheathed by an extruded plastic ring. Working surfaces for forming the form-fitting connection may in turn be provided on the plastic ring. The counterpart is preferably arranged as a flange housing on an engine block. The form-fitting connection is constructed as working surfaces which are provided on the liquid filter and on the counterpart and intermesh or interlock in the attached state. The working surfaces may be ribs, cams or webs, which are brought into mutual engagement through axial and/or radial movement of the liquid filter. The embodiment of a threaded connection may be omitted with this arrangement. The working surfaces may be provided outside of the center of the liquid filter. Consequently, it is not necessary to have a plate-shaped component on the open end of the filter housing, thereby reducing the weight and the cost of materials.

In one advantageous embodiment of this invention, the means for a form-fitting connection between the liquid filter and the counterpart may comprise a bayonet joint. The bayonet joint is formed by a relative rotational movement of the liquid filter with respect to the flange housing. Multiple contours are therefore provided on the liquid filter and on the flange housing, these contours being intermeshed and having a slope with respect to the filter axis. The slope extends over a defined peripheral angle and develops into an area extending parallel to the sealing flange.

In addition, the corresponding contours are designed so that they create a locking effect during the rotational movement and they may form a stop for limiting the rotational movement. The locking effect may be achieved, for example, by a zigzag path of the corresponding contours. Alternatively, the locking effect may also be achieved by moveable working elements which engage in a contour of the counterpart or the liquid filter when in a defined position. This may be, for example, a spring-loaded ball or a pin engaging in a borehole in the counterpart.

An elastomer gasket is preferably provided between the liquid filter and the flange housing, with the gasket being clamped by the bayonet joint between two corresponding sealing surfaces. This elastomer gasket may be arranged both axially and radially. In the case of a radial arrangement of the elastomer gasket, it may generate the tension required for the catch connection. The means for producing the bayonet joint are fixedly attached to a filter housing on one end face, e.g., on the filter housing or on a connecting element. These joint producing means border the cylindrical interior space of the filter housing on one end and at the same time form a contour for supporting the filter element. Suitable materials for the filter housing as well as the means for forming the bayonet joint include both metals and synthetic resin materials (i.e., plastics), for example, polyamide (nylon) or polypropylene.

The advantages of this arrangement make it possible to produce a defined tension between the liquid filter and the counterpart without any auxiliary means. The liquid filter is attached to the flange housing and tightened by the mechanic, the angle of rotation being limited by a stop or a catch on the bayonet joint. Due to the predetermined slope of the bayonet contour, the tension on the gasket between the liquid filter and the flange housing is defined and ensured regardless of the tightening torques. This allows a simple and reliable way of assembling and/or disassembling of the liquid filter. In the case of the radial arrangement of the elastomer gasket, sticking of the latter on the surface is prevented, and thus easy release of the liquid filter during disassembly is ensured.

According to an alternative embodiment, the means for forming the form-fitting connection are constructed as a lockable clip connection. To this end, hook-like contours may be provided on the liquid filter or on the counterpart, for example, engaging in a snap contour due to their elasticity. A plate-shaped part on the open housing part may also be omitted in the arrangement of these contours. A simple, rapid and reliable connection is therefore advantageously established in an economical and simple manner.

A form-fitting connection by at least one clamp is another advantageous variant. The clamp extends over the liquid filter or a shoulder or a web of the liquid filter, for example, thereby pressing it against the counterpart. A plurality of elastic clamps may also be pivotably attached to the counterpart, for example. Due to the use of clamps, a reliable tension force can be achieved between the liquid filter and the counterpart. This allows a simple, rapid and economical assembly procedure.

In another embodiment of the present invention, the means for forming the bayonet joint are provided on a connecting ring which is fixedly joined to the filter housing with a seal on the open-end face, thus forming the end-face end. The means forming the bayonet joint may be aligned radially outward, inward or in the axial direction of the filter axis. The connection forming means may protrude beyond the connecting ring or may be shaped as a contour into the ring.

If desired, a gasket groove to accommodate an elastomer gasket may also be provided at the same time on the connecting ring. This is preferably arranged on the end face or on a recessed edge of the connecting ring. An edge protruding inward or a collar on the connecting ring may be used as a supporting surface to support the filter element. The connecting ring is preferably made of a metal or a plastic by the original molding method, in particular by the injection molding method, but it may also be manufactured as a lathed, milled or deep-drawn part.

The connecting ring makes it possible in an advantageous manner to integrate several functions into one component and thereby achieve a simple and economically advantageous manufacturing method. Furthermore, the connecting ring makes it possible to reduce the cost of materials in comparison with an end face plate and thereby also greatly minimize the weight of the liquid filters. In the case of a connecting ring manufactured by the original molding process, no machining residues remain in the liquid filter element because machining that removes material is unnecessary. Since the connecting ring can be positioned in direct proximity to the sealing ring, sagging of the end face is prevented, thereby achieving a better stability with respect to high pressure loads.

In another embodiment of the present invention, the filter housing comprises a sheet metal vessel manufactured by the deep-drawing method. To facilitate attachment, profiles such as longitudinal grooves or polygonal profiles may also be molded on the filter housings manufactured by this method. These filter housings have a homogeneous material thickness and are very stable under pressure. The attachment of the filter housings to the connecting ring may be accomplished, for example, by flanging or by sheet metal folding. The deep drawing process provides a very reliable method of manufacturing the filter housing that is economically very advantageous.

In accordance with another embodiment, the filter housing is manufactured as an injection-molded part, a die-cast part or an extruded part. Consequently, the filter housing may also be produced from synthetic resin materials such as polyamide or polypropylene or from light metals such as aluminum alloys. Furthermore, it is possible to produce components such as the connecting ring as inserts in laminates by the manufacturing method indicated above.

In another advantageous embodiment of the invention, the filter element is supported by a molded disk on an intermediate ring. The molded disk supports the filter element or an end disk that seals the filter element with respect to the connecting ring. The molded disk extends to the wall area of the housing and centers the filter element in the housing. The molded disk may be made essentially of plastic or metal. To compensate for possible manufacturing tolerances, the molded disk may be made of an elastic or resilient material. A spring metal plate, for example, is suitable for this purpose. The molded disk therefore holds the filter element in its axial position. The molded disk rests on the connecting ring in some sections and thus ensures flow channels for the oncoming flow of unfiltered oil on the raw unfiltered side of the filter.

The arrangement of the molded disk makes it possible to variably configure the individual components in an advantageous manner, e.g., to use the same molded disk for several types of filters. Furthermore, the filter element is not secured radially, so the radial tolerance between the filter element and the connecting ring can be compensated by the molded disk.

In another advantageous variant of the present invention, the molded disk extends over the entire end face of the filter medium and is permanently attached to it in a sealed manner. Consequently, the molded disk simultaneously forms the end disk of the filter element and ensures the sealing of the filter medium, the axial support and the centering of the filter medium in the filter housing. The molded disk may also be attached to a central pipe arranged at the center of the filter medium. This reduces the complexity in terms of individual parts and advantageously saves on the cost of materials, manufacturing, assembly and logistics.

According to another embodiment of the present invention, a return flow barrier membrane is provided on the molded disk. The molded disk must therefore establish a tight connection with respect to the connecting ring. This results in a valve function which allows the oncoming oil to pass through in the direction of the filter medium on the raw or unfiltered side of the filter and prevents a return flow of the oil. The return flow barrier membrane has a greater elasticity than the molded disk and can be attached to the molded disk by gluing or fusion welding, for example.

As an alternative, the membrane may also be produced together with the molded disk as an injection molded part in a two-component injection molding process. When closed, the return flow barrier membrane may be in radial contact with a sealing edge, for example, or in axial contact with a contour of the connecting ring.

Another advantageous variant of the present invention utilizes at the same time the molded disk and/or the end disk as a sealing element with respect to the clean side at the center of the filter element. The oncoming flow to the raw unfiltered side of the liquid filter is usually through the outside of the cylindrical filter element and the outgoing flow on the clean side of the filter medium is usually through an inlet nipple arranged on the counterpart at the center of the filter medium.

The seal between the clean side and the unfiltered side may be provided by the end disk. In an embodiment with a metallic end disk, this seal may be formed by an elastomer gasket, a nonwoven ring, an O-ring or a metal cone. In an embodiment with a plastic end disk, the seal may be formed by an elastomer gasket, a nonwoven ring, an O-ring or a plastic cone. In the arrangement of the paired sealing materials, the gasket may be constructed as an external gasket outside of the incoming flow connection or as an internal gasket inside the incoming flow connection. In the design as an internal gasket, the end disk has an annular collar or a pipe section which protrudes into the inside of the incoming flow connection.

The end disk may also be constructed as a so-called film end disk which is made of nitrile rubber, for example, and is cast on an end face of the filter medium. In the case of an end disk made of nitrile rubber, the end disk may be reinforced by a supporting disk which is manufactured in one piece with the central pipe and rests on the end disk. This makes it possible for the filter element to be supported with a spring element opposite a closed housing side.

These design variants make it possible in an advantageous manner to integrate the sealing concept between the raw side and the clean side into the end disk and/or the molded disk and to adapt it to the particular installation situation.

To protect the filter medium against exposure to excessive pressure when the filter medium is soiled or in the presence of viscous oil, in another embodiment a bypass valve is provided on an end disk opposite the oil outlet. This bypass valve may, for example, be constructed as a plastic valve integrated into the end disk or be arranged in communication with a central tube. The bypass valve also may, for example, be integrated into a metal plate spring which supports the filter element with respect to the closed side of the filter housing. In this case, the bypass element is integrated into the metal spring in such a way that it communicates with a central opening in the end disk. It is also possible to arrange the bypass valve as a tube valve on a central pipe. In this way the bypass valve can be integrated into the filter element in a simple and economically advantageous manner.

In one advantageous embodiment, the filter housing is attached to the connecting ring by adhesive bonding or welding. Welding is preferably selected for pairings of like materials. Alternatively the connection may also be formed by flanging, in which case the flanging may be designed to ensure a seal. In the case of a combination of plastic and metal, an adhesive bond or a joint connection will be selected. Both methods form a tight seal and are simple and reliable to manufacture. At the same time, it becomes unnecessary to provide an additional seal between the connecting ring and the filter housing, thereby yielding an economic advantage.

The present invention additionally relates to a counterpart for the liquid filter according to the invention. This counterpart is usually a flange housing mounted on a machine assembly, such as an engine block. The counterpart may also be manufactured in one piece with the machine assembly, however. Contours, in particular thread-like ribs, are provided on the counterpart and are suitable for establishing a bayonet joint. To produce a tight connection, a seal is provided between the liquid filter and the counterpart. The seal may, for example, be an elastomer gasket or a conical connection. In the case of an elastomer gasket, it may be provided on the liquid filter and may correspond to a sealing surface of the counterpart. Of course, the elastomer gasket may also be provided on the counterpart and the sealing surface may be provided on the liquid filter.

According to one advantageous embodiment, the counterpart is constructed as an adapter element having elements for producing a bayonet joint on one end which faces the liquid filter and having a threaded connection with a flange on its other end which faces the machine assembly. Such an adapter element makes it possible in an advantageous manner to mount the inventive liquid filter on a flange which is designed for a traditional liquid filter equipped with a threaded connection. This makes it possible to retrofit a traditional flange by a simple method.

In one advantageous variant, the adapter element has a threaded connection on the liquid filter end and means for establishing a bayonet joint with a flange on the ends facing the machine aggregate. It is thus advantageously possible to mount a traditional liquid filter equipped with a threaded connection on a bayonet flange.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
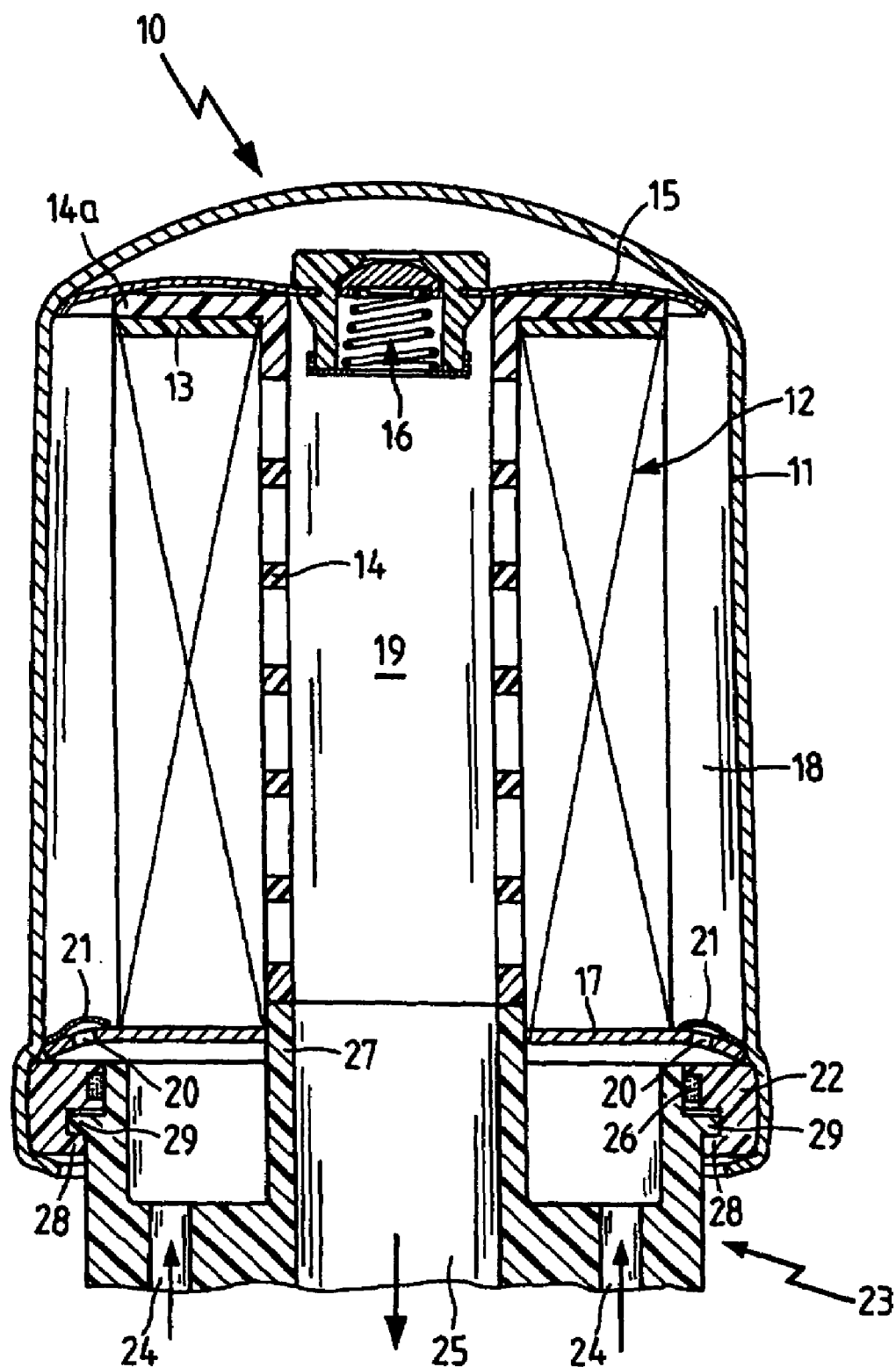
FIG. 1 is a sectional view of a liquid filter and a counterpart therefor according to the invention.

FIG. 1 shows a liquid filter 10 which comprises a filter medium 12 in a filter housing 11. The filter medium 12 is mounted in a sealed manner between an upper end disk 13 and a lower molded disk 17. The upper end disk 13 may be made, for example, of an elastic nitrile rubber, and the lower molded disk 17 may be made, for example, of a thermoplastic synthetic resin such as polyamide or polypropylene. The interior of the hollow cylindrical filter medium 12 is supported against a central tube 14 through which the flow can pass. Support tube 14 is manufactured in one piece with a tube collar 14a arranged on the upper end face.

The filter medium 12 is supported through the tube collar 14a relative to the housing 11 by a metal spring plate 15. The filter medium 12 is centered and secured axially in the housing 11 by metal spring plate 15. Furthermore, a bypass valve 16 is attached to the metal spring plate 15 and is urged against the tube collar 14a in a sealed manner by the spring plate. The molded disk 17 protrudes radially outwardly beyond the filter medium 12 as far as the wall of the filter housing 11 and contacts a connecting ring 22 in the axial direction of the filter medium 12, so that the filter medium 12 is centered in the housing 11 and secured axially.

The areas of contact between the molded disk 17 and the connecting ring 22 form a seal with respect to one another so that it is impossible for the liquid to flow back in the area of the contact surfaces. Flow openings 20 with blocking membranes 21 which provide a valve function are provided in the molded disk 17 and prevent return flows of oil from the unfiltered side of the filter element.

As a result of the shape of the housing 11, the connecting ring 22 is connected in a sealed manner to the wall of the housing. This connection may be created or supported by gluing, flanging or welding. For example, an elastic molded gasket may be provided between the housing 11 and the connecting ring 22.

Connecting ring 22 forms a detachable connection with a counterpart 23, shown partially here. The counterpart 23 has an oncoming flow side 24 and an outgoing flow side 25 which must be sealed with respect to one another in the area where counterpart 23 engages the liquid filter 10. The sealing with respect to the surrounding environment is formed radially by an elastomer gasket 26 which is arranged in a groove between the counterpart 23 and the connecting ring 22. To seal the clean side 18 with respect to the raw side 19, a cylindrical nipple 27 of the counterpart 23 protrudes into the connecting ring 17 which serves as the end disk of the filter element. The attachment of the counterpart 23 to the liquid filter 10 is achieved through a plurality of retaining lugs 28 which are provided on the connecting ring 22 and which engage corresponding guide webs 29 provided on the counterpart 23. To this end, the guide webs 29 which have a thread-like construction, are formed radially around the counterpart 23. By rotating the liquid filter 10, the filter is clamped axially on the counterpart 23, thus forming a bayonet connection. To prevent the liquid filter 10 from coming loose, a locking mechanism may be provided, for example, by providing a zigzag or toothed contour on the guide web 29.

Figure 2:
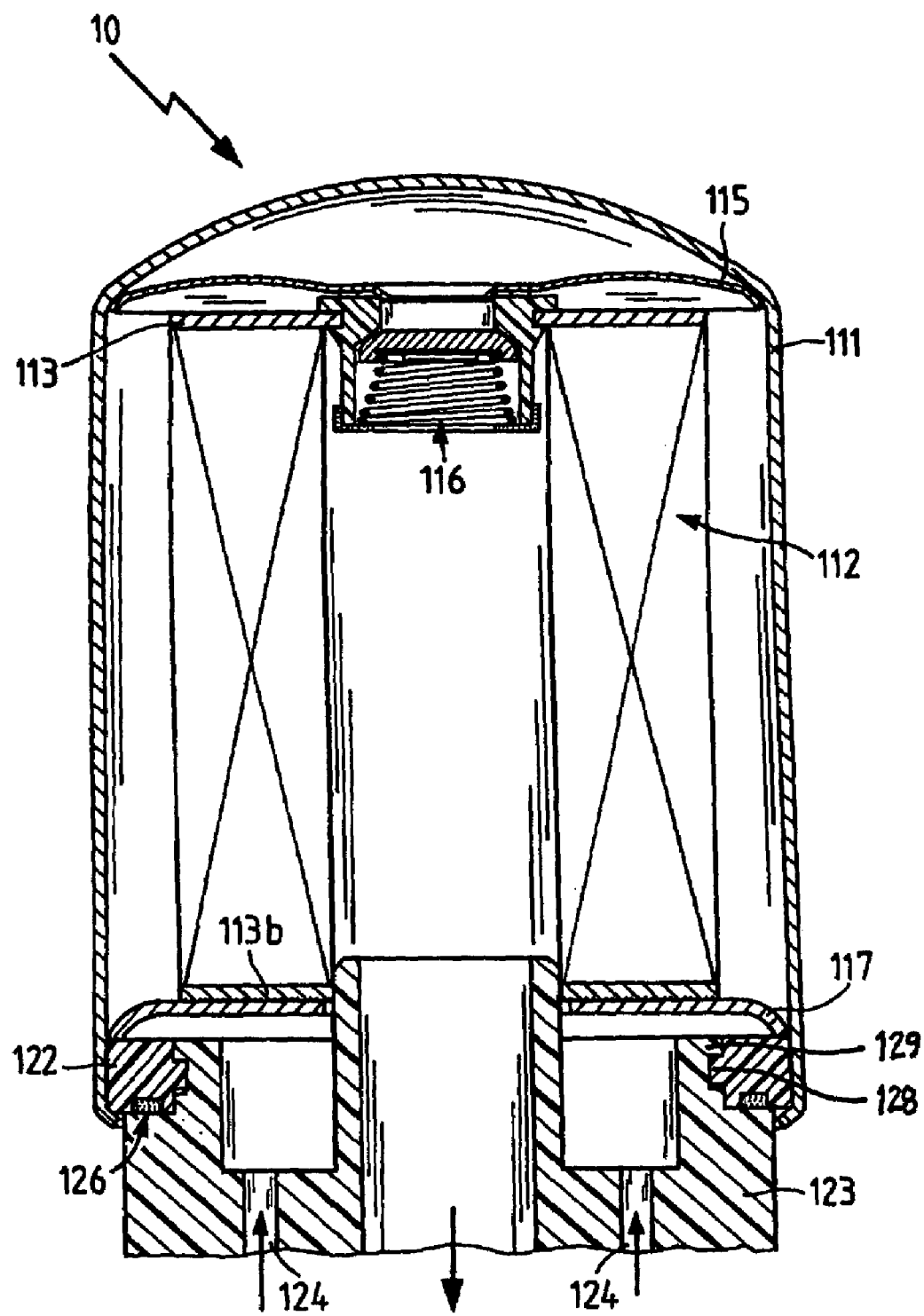
FIG. 2 is a sectional view of another liquid filter embodiment and counterpart according to the invention.

FIG. 2 shows another variant of the liquid filter 10 according to the invention. Components which correspond to those depicted in FIG. 1 are identified by like reference numerals increased by 100. The filter medium 112 is centered and secured axially in the housing 111 by the metal spring plate 115 and the molded disk 117. The bypass valve 116 is pressed by the spring metal plate 115 directly against the upper end disk 113. A lower end disk 113b and the upper end disk 113 may both be made of sheet metal. The molded disk 117 is manufactured as a separate component which can be adhesively bonded or otherwise attached to the lower end disk 113b. The elastomer gasket 126 is arranged in the axially facing direction in a groove on the connecting ring 122. The counterpart 123 is shown here only in part and is provided with a corresponding flat surface for engaging gasket 126. A form-locking connection is formed between retaining lugs 128 on the connecting ring 122 and guide webs 129 on counterpart 123.

Figure 3:
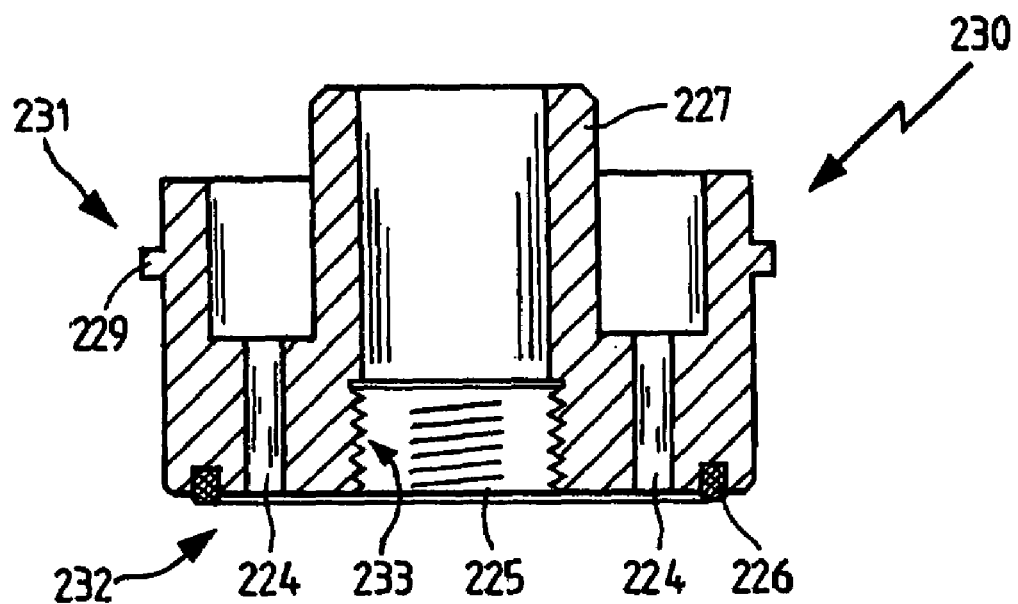
FIG. 3 is a sectional view of an adapter element that serves as a counterpart according to the invention.

FIG. 3 shows a counterpart according to the invention designed as a bayonet adapter 230, which serves to adapt a liquid filter 10 equipped with a bayonet connector as depicted in FIG. 1 to a conventional mounting flange equipped with a threaded connection. To achieve this result, adapter 230 has a bayonet connector 231 on one side and a threaded sleeve 232 on the opposite side. The bayonet connector 231 has as the elements to form the bayonet connector the guide web 229 and the connecting nipple 227. These serve to establish a connection to a filter equipped with a bayonet connector. An inside thread 233 and the elastomer gasket 226 are provided to form the threaded sleeve 232. As a result, a rigid, releasable and tightly sealed connection to a conventional receiving flange equipped with a threaded nipple can be established via the threaded sleeve 232. The oncoming liquid flow passes through the bayonet adapter 230 through the oncoming flow side 224 and the outflow passes through the outflow side 225.

Figure 4:
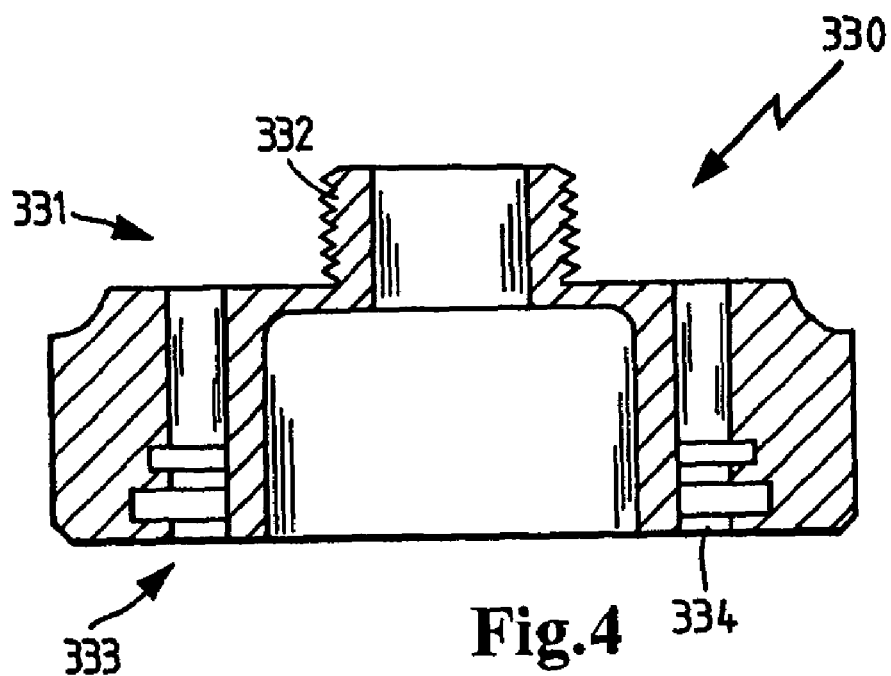
FIG. 4 is a sectional view of an alternate adapter according to the invention.

FIG. 4 shows a threaded adapter 330 which is used for adapting a traditional replaceable filter element with a threaded connection to a counterpart that is designed for a bayonet connector. For this purpose the threaded adapter 330 has a threaded nipple 332 on a threaded connection end 331. The threaded connection end 331 mates with a conventional threaded, replaceable filter element. A bayonet connection end 333 on the opposite side of the adaptor 330 is constructed to engage with the counterpart which has connecting elements for forming a bayonet joint. For this purpose bayonet contours 334 are molded onto the bayonet connection end 333 of the adaptor.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A liquid filter comprising a filter housing with an essentially hollow cylindrical filter element arranged therein in a sealing manner to separate an unfiltered liquid side of the filter from a filtered liquid side, said filter housing being detachably and sealingly connectable to a counterpart, wherein means for forming a detachable form-fitting bayonet connection are provided on an axial end of the filter housing and on the counterpart;

wherein the means for forming the form-fitting connection of the filter housing are arranged on a connecting ring which is permanently attached to the filter housing; and the filter element is supported by a molded disk on the axial end of the filter element facing the counterpart and the molded disk has a distal edge that extends outwardly beyond the filter element and the distal edge is connected directly to the connecting ring such that the filter element is supported on the connecting ring.

2. A liquid filter according to claim 1, wherein the filter housing comprises a sheet metal vessel manufactured by a deep drawing method.

3. A liquid filter according to claim 1, wherein the filter housing is manufactured by injection molding, pressure molding or flow molding.

4. A liquid filter according to claim 1, wherein the molded disk is an end disk of the filter element.

5. A liquid filter according to claim 1, wherein the molded disk is provided with flow apertures covered by a barrier membrane for preventing return flows.

6. A liquid filter according to claim 1, wherein the filter element has two end disks, and one of said end disks forms a central seal with respect to a portion of a counterpart to which the filter element is attached.

7. A liquid filter according to claim 1, further comprising a bypass valve in an end disk of the filter element.

8. A liquid filter according to claim 1, wherein the filter housing is attached to the connecting ring by flanging, gluing or welding.

9. A liquid filter comprising:
a filter housing with an essentially hollow cylindrical filter element arranged therein in a sealing manner to separate an unfiltered liquid side of the filter from a filtered liquid side; and
a counterpart for the liquid filter:
wherein the filter housing is detachably and sealingly connectable to the counterpart, and means for forming a detachable form-fitting bayonet connection are provided on an axial end of the filter housing and on the counterpart;
wherein the means for forming the form-fitting bayonet connection on the filter housing are arranged on a connecting ring which is permanently attached to the filter housing; and the filter element is supported by a molded disk on the axial end of the filter element facing the counterpart and the molded disk has a distal edge that extends outwardly beyond the filter element and the distal edge is connected directly to the connecting ring such that the filter element is supported on the connecting ring; and wherein said counterpart comprises means for forming a mating form-fitting bayonet connection to the liquid filter and means for sealing the connection between the filter housing and the counterpart, whereby said counterpart is detachably and sealingly connectable to said filter housing.

10. A liquid filter according to claim 9, wherein said counterpart is an adapter element which has the means for forming a form-fitting bayonet connection to the filter housing on one end thereof and further comprises means for forming a threaded connection with a flange on the opposite end thereof.

\* \* \* \* \*